United States Patent
Duchateau et al.

(10) Patent No.: US 9,637,591 B2
(45) Date of Patent: May 2, 2017

(54) PE-LIKE POLYESTERS

(71) Applicant: SAUDI BASIC INDUSTRIES CORPORATION, Riyadh (SA)

(72) Inventors: Robbert Duchateau, Eindhoven (NL); Mark Petrus Franciscus Pepels, Eindhoven (NL)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/893,276

(22) PCT Filed: Jun. 20, 2014

(86) PCT No.: PCT/IB2014/062460
§ 371 (c)(1),
(2) Date: Nov. 23, 2015

(87) PCT Pub. No.: WO2014/203209
PCT Pub. Date: Dec. 24, 2014

(65) Prior Publication Data
US 2016/0102172 A1    Apr. 14, 2016

(30) Foreign Application Priority Data
Jun. 20, 2013    (EP) .................................... 13173039

(51) Int. Cl.
| C08G 63/91 | (2006.01) |
| C08G 63/00 | (2006.01) |
| C08G 63/78 | (2006.01) |
| C08G 63/82 | (2006.01) |
| C08G 63/08 | (2006.01) |
| C08L 23/02 | (2006.01) |
| C08L 67/04 | (2006.01) |
| C08G 61/12 | (2006.01) |

(52) U.S. Cl.
CPC ........... *C08G 63/912* (2013.01); *C08G 63/00* (2013.01); *C08G 63/08* (2013.01); *C08G 63/78* (2013.01); *C08G 63/823* (2013.01); *C08G 63/826* (2013.01); *C08L 23/02* (2013.01); *C08L 67/04* (2013.01); *C08G 61/12* (2013.01); *C08G 2261/3322* (2013.01); *C08G 2261/3342* (2013.01); *C08G 2261/418* (2013.01)

(58) Field of Classification Search
CPC ...... C08G 63/912; C08G 63/00; C08G 63/08; C08G 63/78; C08G 63/823; C08G 63/826; C08G 61/12; C08G 2261/3322; C08G 2261/3342; C08G 2261/418; C08L 23/02; C08L 67/04
See application file for complete search history.

(56) References Cited

U.S. PATENT DOCUMENTS

| 6,486,296 | B1 | 11/2002 | Shimamoto et al. | |
| 8,901,253 | B2 | 12/2014 | Behl et al. | |
| 8,933,190 | B2 | 1/2015 | Van Der Meulen et al. | |
| 2008/0125568 | A1 | 5/2008 | Endo et al. | |
| 2009/0187001 | A1* | 7/2009 | Pawlow et al. | C08G 61/08 528/271 |
| 2012/0108784 | A1* | 5/2012 | Clauss et al. | C08G 63/12 528/302 |
| 2012/0136134 | A1 | 5/2012 | Van Der Meulen et al. | |
| 2015/0018497 | A1* | 1/2015 | Farrugia et al. | C08G 63/823 525/450 |
| 2015/0376330 | A1 | 12/2015 | Duchateau et al. | |
| 2016/0083510 | A1 | 3/2016 | Duchateau et al. | |
| 2016/0096919 | A1 | 4/2016 | Bouyahyi et al. | |

FOREIGN PATENT DOCUMENTS

| CN | 102617369 S | 8/2012 |
| DE | 2535562 A1 | 2/1977 |
| EP | 0686656 | 12/1995 |
| WO | 2010110460 A1 | 9/2010 |
| WO | 2012065711 A1 | 5/2012 |

OTHER PUBLICATIONS

EP Search Report (extended) for EP13173039.2, Nov. 15, 2013, 6 pages.
International Search Report for PCT/IB2014/064260 mailed Sep. 25, 2014, 4 pages.
Stempfle, Florian, et al., "Which Polyesters Can Mimic Polyethylene?", Macromolecular Rapid Communications, 34 (2013) 47-50.
van der Meulen, Inge, et al., "Catalytic Ring-Opening Polymerisation of Renewable Macrolactones to High Molecular Weight Polyethylene-like Polymers", Macromolecules, 44 (2011) 4301-4305.
Written Opinon of the International Searching Authority for PCT/IB2014/062460 mailed Sep. 25, 2014, 6 pages.
Bouyahyi, Miloud "ω-Pentadecalactone Polymerization and ω-Pentadecalactone/ε-Caprolactone Copolymerization Reactions Using Organic Catalysts", Macromolecules, 45 (2012) 3356-3366.
Chen et al.; "Ring-Opening Polymerization of Lactides Initiated by Zinc Alkoxides Derived fom NNO-Tridentate Ligands"; Macromolecules, 39; (2006); pp. 3745-3752.
Darensbourg et al.; "Ring-opening polymerization of cyclic monomers by biocompatible metal complexes. production of poly(lactide), polycarbonates, and their copolymers"; Macromolecules, 40; (2007); pp. 3521-3523.
De Geus, Matthijs, et al., "Performance polymers from renewable monomers: high molecular weight poly (pentadecalactone) for fiber applications", Polym. Chem., 1, 525-533 (2010).

(Continued)

Primary Examiner — Nathan M Nutter
(74) Attorney, Agent, or Firm — Cantor Colburn LLP

(57) ABSTRACT

A polyester having a saturated backbone, a method of preparing said polyester, an intermediate unsaturated polyester product, and a method for preparing said intermediate unsaturated polyester product, where the number of carbon backbone atoms between two neighboring ester groups in the backbone is randomly distributed over the polyester, and the polyester has an M/E ratio of 14 or more, wherein M is the number of backbone carbon atoms in the polyester not including the ester carbons and E is the number of ester groups in the polyester.

20 Claims, No Drawings

(56) References Cited

OTHER PUBLICATIONS

Duda, Andrzej, et al., "Kinetics of the Ring-Opening Polymerization of 6-, 7-, 9-, 12-, 13-, 16-, and 17-Membered Lactones. Comparison of Chemical and Enzymatic Polymerizations", Macromolecules, 35, 4266-4270 (2002).

Focarete, Maria Letizia, et al., "Physical Characterization of Poly(v-pentadecalactone) Synthesized by Lipase-Catalyzed Ring-Opening Polymerization", Journal of Polymer Science: Part B: Polymer Physics, vol. 39, 1721-1729 (2012).

Fokou et al.; "Studying and Suppressing Olefin Isomerization Side Reactions During ADMET Polymerizations"; Macromolecular Rapid Commun., 31 (2010); pp. 368-373.

Hunsicker et al.; "Synthesis of High Molecular Weight Polyesters via in Vacuo Dehydrogenation Polymerization of Diols"; Rapid Commun., 33; (2012); pp. 232-236.

Kumar, et al., "Efficient Ring-Opening Polymerization and Copolymerization of e-Caprolactone and w-Pentadecalactone Catalyzed by Candida antartica Lipase B", Macromolecules 2000, vol. 33, pp. 6303-6309.

Stempfle et al. "Long-Chain Linear C19 and C23 Monomers and Polycondensates from Unsaturated Fatty Acid Esters"; Macromolecules, 44; (2011); pp. 4159-4166.

Trzaskowski et al.; "Aliphatic Long-Chain C20 Polyesters from Olefin Metathesis"; Rapid Commun. 32; (2011); pp. 1352-1356.

Uyama, H., et al,, "Lipase-catalyzed ring-opening polymerization and copolymerization of 15-pentacanolide", Acta Polymer. 47 (1996) 357-360.

Zhong, Z., et al., "Controlled ring-opening polymerization of x-pentadecalactone with yttrium isopropoxide as an initiator," Macromol. Chem. Phys. 201, 1329-1333 (2000).

Darensbourg et al.; "Ring-Opening Polymerization of Cyclic Monomers by Complexes Derived from Biocompatible Metals. Production of Poly(lactide), Poly(trimethylene carbonate), and Their Copolymers"; Macromolecules 2008; 41 (10); pp. 3493-3502.

Van Der Meulen et al.; "Polymers from Functional Macrolactones as Potential Biomaterials: Enzymatic Ring Opening Polymerization, Biodegradation, and Biocompatibility"; Biomacromolecules 2008; 9; pp. 3404-3410.

\* cited by examiner

PE-LIKE POLYESTERS

This application is a national stage application of PCT/IB2014/062460, filed Jun. 20, 2014, which claims priority to European Application 13173039.2 filed Jun. 20, 2013, which are hereby incorporated by reference in their entirety.

TECHNICAL FIELD

The invention is directed to a polyester having a saturated backbone, to a method of preparing said polyester, to an intermediate unsaturated polyester product, and to a method for preparing said intermediate unsaturated polyester product. More in particular, the invention is directed to polyesters wherein the number, or amount, of backbone carbon atoms between two neighboring ester groups in the backbone is randomly distributed over the polyester.

BACKGROUND

In light of the goal to establish a sustainable pathway to polymers, exploitation of renewable resources through green production procedures is currently of high interest. Considering the depletion of petroleum resources and the accumulation of polymer waste, research efforts have focused on developing novel polymers and polymer production processes that use renewable feedstock.

Polyethylene is the largest volume synthetic polymer produced worldwide. It is produced in various forms and has acquired a large commercial market in films, sheets, pipes, fibres, containers, bottles, and many other applications. Its conventional production relies on petroleum based ethylene gas. Depending on the polymerization process, low or high density polyethylene can be produced under high or low pressure, respectively. Moreover, the catalyst used for the production process has an effect on the macromolecular architecture of the formed polyethylene. A still important procedure for the production of polyethylene was introduced by Philips using a chromium based catalyst ($Cr/SiO_2$). Although this system has poor control on the molecular weight, it still covers the major volume of the global polyethylene production. In the mid 1950's, with the discovery of Ziegler-Natta catalysts, and later on the metallocene and other single-site catalysts, it was possible to achieve higher control on polydispersity indices, which are about 4 and 2, respectively. For all mentioned processes fully petroleum derived ethylene is being used in order to synthesize large amounts of this highly important polymer. Due to the awareness of oil depletion and the waste problem as well as legislation, there is a need for alternative production processes for polyethylene wherein renewable feedstock is used.

Alternatively, so-called polyethylene mimics are explored. These are polymers that have polyethylene-like properties and behavior. For example, polyesters can form a biodegradable alternative for polyethylene in many applications. Polyesters are of high commercial interest because of the properties that they can exhibit. These properties, for instance, include biocompatibility, biodegradability and drug permeability. Therefore, polyesters are of great interest, e.g., for medical and food packaging applications. For these purposes, materials with an engineered structure are desired, which implies the need for a high level of control over the polymerization reaction.

The synthesis of polyesters with polyethylene-like properties via ring-opening polymerization of a renewable macrolactone has been reported (Van der Meulen et al. *Macromolecules* 2011, 44 (11), 4301-4305). Due to the presence of ester functionalities within the monomers reported therein, the prepared polymers can favorably be considered as biodegradable, thus differing considerably from polyethylene. Also, polycondensation of stoichiometric amounts of dimethyl 1,26-hexacosanedioate and 1,26-hexacosanediol, with titanium(IV)butoxide as a catalyst precursor to afford a polyester-26,26 has been described (Stempfle et al. *Macromolecular Rapid Communications* 2013, 34, 47-50).

These known polyethylene mimics, however, have a relatively high number of ester groups within the polymer chain, while polyesters having long methylene sequences would mimic polyethylene properties better. As the structure of the final product is restricted by the synthesis route, the versatility of fine-tuning the material's properties is limited.

SUMMARY

Disclosed herein is a polyester comprising a saturated backbone, wherein the number of backbone carbon atoms between two neighboring ester groups in the backbone is randomly distributed over the polyester, and wherein said polyester comprises an M/E ratio of 14 or more, wherein M is the number of backbone carbon atoms in the polyester not including the ester carbons and E is the number of ester groups in the polyester.

Further disclosed is a method of preparing a polyester, the method comprising copolymerizing one or more unsaturated lactones and one or more cycloalkenes via ring-opening metathesis polymerization to obtain an unsaturated polyester; and hydrogenating the unsaturated polyester to obtain the corresponding saturated polyester, said polyester having a saturated backbone, wherein the number of backbone carbon atoms between two neighboring ester groups in the backbone is randomly distributed over the polyester, and wherein said polyester comprises an M/E ratio of 14 or more, such as 30 or more, preferably 40 or more, more preferably 50 or more, such as in the range of 50-500, and wherein M is the number of backbone carbon atoms in the polyester not including the ester carbons, and E is the number of ester groups in the polyester.

Also described herein is a polyester comprising an unsaturated backbone, wherein the number of carbon atoms between two neighboring ester groups in the backbone is randomly distributed over the polyester, and wherein said polyester comprises an M/E ratio of 14 or more, wherein M is the number of backbone carbon atoms in the polyester not including the ester carbons and E is the number of ester groups in the polyester.

Further described herein is a method of preparing the an unsaturated polyester, said method comprising copolymerizing an unsaturated lactone and a cycloalkene via ring-opening metathesis polymerization to obtain an unsaturated polyester, said polyester having an unsaturated backbone, wherein the number of backbone carbon atoms between two neighbouring ester groups in the backbone is randomly distributed over the polyester, and wherein said polyester comprises an M/E ratio of 14 or more, wherein M is the number of backbone carbon atoms in the polyester not including the ester carbons and E is the number of ester groups in the polyester.

DETAILED DESCRIPTION

Disclosed herein is a new polyester and synthesis method thereof. In particular, disclosed herein are random polyesters that comprise a high M/E ratio (wherein M is the number of backbone methylene units and E is the number of ester functionalities). Such a random polyester can, for instance, be prepared by copolymerizing an unsaturated lactone with a cycloalkene followed by hydrogenation.

An alternative synthesis route to polyesters mimicking polyethylene is provided, which synthesis route can be readily tuned to arrive at the desired final polymer product. Further, a polyester with a favorable ratio of the number of methylene units over the number of ester groups that mimics polyethylene well is provided Accordingly, in a first embodiment the random copolyesters are a polyester having a saturated backbone, wherein the number of backbone carbon atoms, typically methylene units, between two neighboring ester groups in the backbone is randomly distributed over the polyester, and wherein said polyester comprises an M/E ratio of 14 or more, wherein M is the number of backbone carbon atoms in the polyester not including the ester carbons and E is the number of ester groups in the polyester.

The random polyesters can advantageously be tuned in a wide range of properties by making small changes in the starting materials. This allows the polyester to be fine-tuned to specific applications and desires. Additionally, the random polyesters comprise a high M/E ratio, which provides them desirable polyethylene-like behaviour. The versatility of the developed synthesis route, in addition to enabling bare linear polyesters, also enables branched polyesters, or polyesters with various functionalities.

The term "polyester" as used in this application is meant to refer to a polyester that is obtained by copolymerization of at least two different monomer species.

The term "backbone" as used in this application is meant to refer to the linear chain to which all other chains, long or short or both, can be regarded as being pendant.

The phrase "the number of backbone carbon atoms between two neighboring ester groups in the backbone is randomly distributed over the polyester" as used in the application is meant to refer to a polyester wherein the number, or amount, of backbone carbon atoms (i.e. carbon atoms forming the backbone, exclusive of carbon atoms in side groups) between two neighboring ester groups is not constant or alternating, but random. This can be illustrated by the following formulae (1) and (2). Formula (1) schematically illustrates a polyester wherein the number of backbone carbon atoms between two neighboring ester groups is constant, namely 17. Formula (2) schematically illustrates an example of a polyester according to the invention wherein the number of backbone carbon atoms between two neighboring ester groups is random.

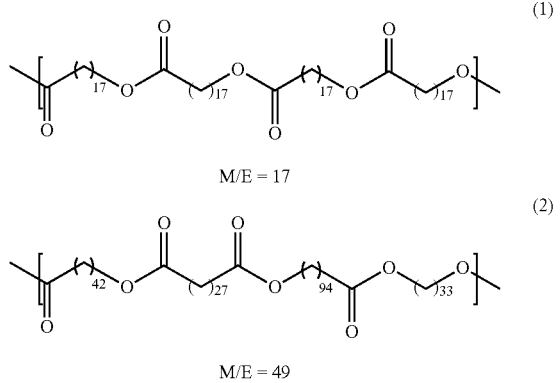

Hence, in an embodiment the number of backbone carbon atoms between two neighboring ester groups in the backbone is not constant and is not alternating.

Each of the ester groups (i.e. —C(=O)—O— groups) in the polyester backbone can have either orientation (i.e. either —C(=O)—O— or —O—C(=O)—). This further distinguishes the random polyesters described herein from conventional polyesters known in the art. In an embodiment, the random polyester comprises two ester groups in the polyester backbone in opposing orientation.

The unique structure of the random polyesters can further be described in the following alternative manner. The phrase "the number of backbone carbon atoms between two neighboring ester groups in the backbone is randomly distributed over the polyester" can also be read in terms of the ester group distribution in the polyester backbone. Therefore, in an embodiment, the random polyesters can be described as having a saturated backbone, wherein the ester groups in the backbone are randomly distributed over the polyester and are randomly oriented, and wherein said polyester comprises an M/E ratio of 14 or more, wherein M is the number of backbone carbon atoms in the polyester not including the ester carbons and E is the number of ester groups in the polyester.

The random polyesters have an M/E ratio of 14 or more, wherein M is the number of backbone carbon atoms in the polyester not including the ester carbons and E is the number of ester groups in the polyester. This M/E ratio can be considered an average M/E ratio for the polyester product. It is preferred that this M/E ratio is even higher, such as 25 or more, 40 or more, or 50 or more. In an embodiment, the M/E ratio is in the range of 50-500. The higher the M/E ratio, the better the properties of polyethylene will be mimicked.

As mentioned above, the polyester can have various functional side groups. These functional side groups can e.g. be introduced into the polyester by using functional monomers. In an embodiment, the random polyester comprises one or more functional side groups that can be one or more hydroxyl, acid, amine, or halogen groups. The functional groups can contain hydrocarbon groups linking the functional group to the polymer chain. Such hydrocarbon groups can for example be optionally substituted straight or branched aliphatic groups comprising from 1 to 30 carbon atoms. Also, non-functional side groups can be present, such as carbyl side groups, wherein carbyl comprises alkyl, and aryl groups. If the random polyester has alkyl side groups, these are preferably $C_{1-6}$ alkyl side groups.

The polyesters can be linear or branched. Preferably, the polyesters have a linear backbone, optionally substituted with side groups. The backbone of the polyesters is saturated, but unsaturations or aromatics can be present in functional side groups. Preferably, the entire polyester is aliphatic (i.e. free from aromatic groups).

The random polyesters can have a number average molecular weight ($M_n$) in the range of 2,000 g/mol to 1,000,000 g/mol, determined as the polystyrene-equivalent molecular weight by high temperature size exclusion chromatography in trichlorobenzene (TCB) using polystyrene as standard. Preferably, the number average molecular weight of the random polyesters is in the range of 10,000 g/mol to 500,000 g/mol, such as in the range of 20,000 g/mol to 200,000 g/mol.

The weight average molecular weight ($M_w$) of the random polyesters can be in the range of 3,000 g/mol to 3,000,000 g/mol, determined as the polystyrene-equivalent molecular weight by high temperature size exclusion chromatography in trichlorobenzene using polystyrene as standard. Preferably, the weight average molecular weight of the random polyesters is in the range of 30,000 g/mol to 1,000,000 g/mol, such as in the range of 30,000 g/mol to 400,000 g/mol.

The polydispersity index, herein defined as $M_w/M_n$, of the random polyesters of the invention can be in the range of 2.0-4.0. Preferably, the polydispersity index is in the range of 2.0-3.5.

Preferably, the random polyesters have a melting temperature of 90° C. of more, more preferably 110° C. or more, even more preferably 120° C. or more as determined with differential scanning calorimetry (DSC) according to the method herein disclosed.

In an embodiment, the smallest number, or amount, of backbone carbon atoms between two neighboring ester groups in the polyester is 4 or more (viz. there are no two neighboring ester groups in the polyester with less than 4 backbone carbon atoms between them). Preferably, the smallest number of backbone carbon atoms between two neighboring ester groups in the polyester is 6 or more, more preferably the smallest number of backbone carbon atoms between two neighboring ester groups in the polyester is 8 or more.

The inventors also found a synthesis route for preparing random polyesters. This synthesis route involves copolymerization of an unsaturated lactone and a cycloalkene via ring-opening metathesis polymerization.

Hence, a further aspect is a method of preparing a polyester, wherein said method comprises (a) copolymerizing one or more unsaturated lactones and one or more cycloalkenes via ring-opening metathesis polymerization to obtain an unsaturated polyester; and (b) hydrogenating the unsaturated polyester product of (a) to obtain the corresponding saturated polyester.
said polyester comprising a saturated backbone, wherein the number of backbone carbon atoms between two neighboring ester groups in the backbone is randomly distributed over the polyester, and wherein said polyester comprises an M/E ratio of 14 or more, wherein M is the number of backbone carbon atoms in the polyester not including the ester carbons and E is the number of ester groups in the polyester.

This synthesis route is highly versatile and allows a fine-tuning of the polyesters. A wide variety of polymers, having on one side polyethylene-like properties, and having on the other side various functionalities, can be obtained using this method.

The unsaturated lactone can suitably comprise a ring size of 6 or more atoms, preferably 10 or more, more preferably 12 or more, such as 12-40 or 12-30 atoms. If desired, the lactone ring can comprise, apart from the ester group and carbon atoms, one or more heteroatoms comprising at least one of oxygen, nitrogen and sulphur. Alternatively, the lactone ring comprises the ester group and carbon atoms. Instead of bare unsaturated lactones, unsaturated lactones with one or more functional groups or substituents can be employed, as long as the functional groups or substituents do not interfere in the ring-opening metathesis polymerization reaction. Examples of such functionalized unsaturated lactones include unsaturated lactones with pendant hydroxyl, acid, or amine groups. The unsaturated lactones act as a source of ester groups for the polyester.

The unsaturated lactone can comprise one or more unsaturations in the ring. Specific examples of such unsaturated lactones include 5-tetradecen-14-olide, 11-pentadecen-15-olide, 12-pentadecen-15-olide (also known as globalide), 7-hexadecen-16-olide (also known as ambrettolide), and 9-hexadecen-16-olide.

Although it can be disadvantageous for the purpose of mimicking polyethylene properties, the unsaturated lactone can have one or more heteroatoms in the ring. For specific applications such heteroatoms in the ring can result in desirable functionalities. An example of such a lactone is 12-oxahexadecen-16-olide.

The cycloalkene can suitably comprise 4 or more ring carbon atoms, preferably 6 or more ring carbon atoms, such as 7-12 ring carbon atoms. Instead of bare cycloalkenes, cycloalkenes with one or more pendant functional groups, such as hydroxyl, acid, amine, or carbyl groups, can be employed. The cycloalkenes act as a source of backbone carbon atoms (viz. backbone methylene groups).

Suitable examples of cycloalkenes include cyclobutene, cyclopentene, cyclohexene, cycloheptene, cyclooctene, cyclodecene, cyclododecene, dicyclopentadiene and norbornene. Optionally, the cycloalkene can be substituted. An example of such a substituted cycloalkene is 1-methylcyclopent-2-ene. Further, in the context of this application, the term "cycloalkenes" is meant to include cycloalkadienes, such as 1,3-cyclohexadiene, 1,4-cyclohexadiene, and 1,5-cyclooctadiene.

The number of monomers in copolymerization step (a) is not limited to two. Further comonomers can be added, such as unsaturated lactones of different structure and cycloalkenes of different structure. For example, functionalized cycloalkenes can be used as comonomers together with unfunctionalized cycloalkenes and unsaturated lactones.

The cycloalkene can be used either in cis or in trans configuration. However, from a reactivity and stability point of view, the cycloalkene is preferably in cis configuration. This configuration is generally more stable than the corresponding trans configuration, although the stability of trans cycloalkenes increases with increasing ring size.

The molar ratio between the unsaturated lactone and the cycloalkene depends on the desired properties of the end product. This molar ratio can, for instance, range from 5:95 to 95:5, such as from 10:90 to 90:10, or from 20:80 to 80:20. In an embodiment the unsaturated lactone and the cycloalkene are used in approximately equimolar amounts.

Step (a) of the method involves copolymerization of an unsaturated lactone and a cycloalkene via ring-opening metathesis polymerization. This step is preferably performed in the presence of a ring-opening metathesis polymerization catalyst. This catalyst is preferably a metal based catalyst, such as a single-site ruthenium-based catalyst. Suitable catalysts, for instance, include a first generation Grubbs' catalyst, a second generation Grubbs' catalyst, a first generation Hoveyda-Grubbs catalyst, a second generation Hoveyda-Grubbs catalyst, or a Zhan catalyst.

In the process to prepare random polyesters the molecular ratio between the lactone and the catalyst is preferably in the range of 20:1-1000:1, more preferably in the range of 40:1-750:1, and even more preferably in the range of 50:1-500:1. Since the amount of catalyst used in the method of the invention can be very small, there is no direct need for separating the catalyst from the polyester product later. However, should there be a need for separating the catalyst from the polymer for whatever reason then the catalyst can, for instance, be separated from the polymer by precipitation of the polyester in a suitable solvent.

The M/E ratio of the polyesters obtainable by the method of the invention can be 14 or more. Preferably, the M/E ratio of the polyesters is 30 or more, more preferably 40 or more, even more preferably 50 or more, such as in the range of 50-500.

Step (a) of the method suitably comprises combining the unsaturated lactone and the cycloalkene together with a ring-opening metathesis polymerization catalyst and optionally a solvent, followed by polymerizing the obtained reaction mixture at a temperature in the range of 0-60° C., such as in the range of 15-50° C. Preferably, the reaction mixture is polymerized at a temperature in the range of 20-45° C., such as about 40° C. If desired, the ring-opening metathesis polymerization can be performed in the presence of a solvent, such as aliphatic or aromatic hydrocarbons (e.g. heptane, toluene, p-xylene), halogenated aliphatic or aromatic hydrocarbons (e.g. dichloromethane, bromobenzene), or ethers (e.g. diethyl ether). The solvent can be used to dissolve the lactone and cycloalkene or to increase the polymerization kinetics and selectivity. The ring-opening metathesis polymerization reaction is preferably performed in an inert atmosphere, such as in a nitrogen atmosphere.

Step (a) is typically carried out until polymerization is complete. The level of conversion can be monitored by testing aliquots of the reaction mixture at specific time intervals by gas chromatography and size exclusion chromatography. A desirable level of conversion typically takes from 1 hour to 3 days. The result of step (a) is an unsaturated polyester intermediate product which will be discussed below.

Step (b) of the method involves hydrogenation of the unsaturated polyester product of (a) to obtain the corresponding saturated polyester. Suitably, this step comprises combining the unsaturated polyester with hydrogenation catalyst, and hydrogenating the unsaturated polyester in the presence of hydrogen at elevated pressure and temperature. Typically, a solution of the polymer in a solvent is injected in a reactor after which a solution of the hydrogenation catalyst is loaded into the reactor. Suitable solvents for the reaction in step (b) include one or more of toluene, xylene, mesitylene, isopar, methylcyclohexane, hexane, and heptane. The reactor can then be loaded with hydrogen gas while the temperature of the reaction mixture can be elevated. The conversion level can be tested using $^1$H NMR by the disappearance of the double bond signal indicative of the unsaturation.

Step (b) of the method is suitably performed in the presence of a hydrogenation catalyst. Examples of suitable hydrogenation catalysts for instance include Wilkinson's catalyst, Pd/C (palladium on carbon), Raney-nickel catalyst, palladium oxide, and platinum oxide.

The applied hydrogen pressure during step (b) can be in the range of 2 bar or more, such as in the range of 2-100 bar, or in the range of 5-50 bar. The reaction temperature during step (b) can be in the range of 70-150° C., such as in the range of 80-120° C.

The obtained saturated polyesters are unique and structurally distinguished from conventional polyesters in that the number of backbone carbon atoms between two neighboring ester groups in the backbone is randomly distributed over the polyester.

Therefore, in yet a further aspect is a polyester comprising a saturated backbone, wherein the number of backbone carbon atoms between two neighbouring ester groups in the backbone is randomly distributed over the polyester, and wherein said polyester has an M/E ratio of 14 or more, wherein M is the number of backbone carbon atoms in the polyester not including the ester carbons and E is the number of ester groups in the polyester.

This distinguishing feature of the saturated polyesters is also present in the unsaturated polyester intermediate product. These unsaturated polyesters are also unique and structurally distinguished from conventional polyesters in that the number of backbone carbon atoms between two neighboring ester groups in the backbone is randomly distributed over the polyester.

Hence, in yet a further aspect is a polyester intermediate product comprising an unsaturated backbone, wherein the number of carbon atoms between two neighboring ester groups in the backbone is randomly distributed over the polyester, and wherein said polyester comprises an M/E ratio of 14 or more, wherein M is the number of backbone carbon atoms in the polyester not including the ester carbons and E is the number of ester groups in the polyester.

The unsaturated polyester intermediate product can be obtained by the same method as described above, but without performing hydrogenation step (b).

Accordingly, in yet a further aspect is a method of preparing the polyester intermediate product of the invention, said method comprising (a) copolymerizing an unsaturated lactone and a cycloalkene via ring-opening metathesis polymerization to obtain an unsaturated polyester, said polyester comprising an unsaturated backbone, wherein the number of backbone carbon atoms between two neighboring ester groups in the backbone is randomly distributed over the polyester, and wherein said polyester comprises an M/E ratio of 14 or more, wherein M is the number of backbone carbon atoms in the polyester not including the ester carbons and E is the number of ester groups in the polyester.

The polyesters described herein can be used in a wide variety of applications depending on their respective properties, such as number average molecular weight, polydispersity index, etc. Some non-limiting exemplary applications include the following. The polyesters can be used in the fabrication of fibres with high mechanical strength. Polyesters with high molecular weight are especially suitable for this purpose. For fibre applications it is further preferred that the polyesters have a relatively low polydispersity index. Furthermore, the polyesters can be used for biomedical applications. Examples of biomedical applications include screws (such as for bone), scaffolding, sutures, drug delivery devices, etc. In addition, the polyesters described herein can be used as a general alternative for polyethylene. In contrast to polyethylene, however, the random polyesters are advantageously biodegradable and biocompatible. Hence, litter of the applied polyester will eventually completely degrade in a time span of months to years as compared to a time span of ages, e.g, multiple decades or more for polyethylene.

The random polyesters will now be further illustrated by the following Examples, which are not intended to be limiting in any way.

EXAMPLES

Unsaturated polyesters with an increasing number of backbone carbon atoms between the ester functionality (M/E) were synthesized by the copolymerization of ambrettolide (Amb) and cis-cyclooctene (CO) via ring-opening metathesis polymerization (ROMP) using as catalyst a first generation Grubbs catalyst (typical ambrettolide:cis-cyclooctene: first generation Grubbs catalyst molar ratios are 0-200:400-0:1). The corresponding saturated polymers were obtained by exhaustive hydrogenation using as a hydrogenation catalyst a Wilkinson's catalyst (see FIG. 1, which shows the synthesis of polyesters with varying amounts or numbers of methylene units between the ester functionalities).

Both ambrettolide and cyclooctene reached a conversion of >99% in all the polymerizations, which resulted in polymers containing various M/E ratios (table 1). These ratios were determined by the $^1$H NMR analysis of the double bond signal (5.2-5.4 ppm) and the α-methylene adjacent to the ester bond (4.0-4.1 ppm) in the unsaturated polyesters. The M/E ratio is defined as the number of backbone carbon atoms in the polyester not including the ester carbons (M) divided by the number of ester groups in the polyester (E) (e.g. polyambrettolide has a M/E of 15). All the unsaturated polymers showed molecular weights ($M_w$) between 96 and 122 kg/mol and polydispersity indices (PDIs) between 2.2 and 3.4. The polymers showed a similar molecular weight before and after hydrogenation. Furthermore, high temperature $^1$H NMR revealed that after hydrogenation no unsaturations or ether functionalities (as a result of hydrogenation of the carbonyl unit) were observed.

TABLE 1

Hydrogenated poly(ambrettolide-co-cyclooctene)

| polymer | Amb:CO:cat molar ratio | M/E [a] | Molecular weight (g/mol) [b] | | PDI | $T_m$ [c] (° C.) | $T_c$ [d] (° C.) |
|---|---|---|---|---|---|---|---|
| | | | $M_n$ | $M_w$ | | | |
| PCE16 | 158:0:1 | 15 | 51 522 | 115 535 | 2.2 | 91.2 | 78.5 |
| PCE24 | 110:110:1 | 23 | 45 243 | 106 061 | 2.3 | 105.0 | 84.9 |
| PCE32 | 85:169:1 | 31 | 49 966 | 119 922 | 2.4 | 111.5 | 90.1 |
| PCE48 | 58:231:1 | 47 | 40 483 | 105 855 | 2.6 | 117.6 | 97.5 |
| PCE80 | 35:282:1 | 78 | 31 239 | 96 975 | 3.1 | 122.6 | 102.1 |
| PCE129 | 20:318:1 | 128 | 35 529 | 121 675 | 3.4 | 128.9 | 103.9 |
| PCE230 | 11:339:1 | 229 | 47 851 | 109 487 | 2.3 | 131.7 | 110.0 |
| PCE∞ | 0:363:1 | ∞ | 33 808 | 109 704 | 3.2 | 132.4 | 106.7 |
| M40053S [e] | | | | | | 131.5 | 118.4 |
| B5823 [e] | | | | | | 131.1 | 117.9 |
| M200056 [e] | | | | | | 129.4 | 119.0 |

Reaction at 40° C. for 3 days. Target $M_n$ = 40 kg/mol. Xylene = 4.5 g.
[a] Determined using $^1$H NMR on the unsaturated polyesters.
[b] Determined on the saturated polymers using SEC in TCB at 160° C.
[c] Temperature of the melting peak of the second heating run.
[d] Temperature of the crystallisation peak of the first cooling run.
[e] Commercial grade HDPE obtained from Sabic Europe.

From differential scanning calorimetry it can be seen that the melting points of the polymers rapidly increase with an increasing M/E ratio. The melting point of PCE16 is comparable to reported values for polyhexadecalactone (Van der Meulen et al., *Biomacromolecules* 2008, 9, 3404-3410). Even though the distribution of the ester bonds over the backbone of the polymers is random, the melting points of PCE24, PCE32 and PCE48 fit well within the trend observed for well-defined polyesters containing long methylene sequences. This trend is further followed (PCE80, PCE129, PCE230) towards an asymptote for the melting point of PCE∞ (132° C.), which corresponds to the melting points of commercial HDPE samples measured under the same conditions. These results show that the melting point between polyesters (M/E=15) and polyethylene (M/E=∞) shows a clear dependence on the M/E ratio.

Reagents and Methods

All solvents and reagents were purchased from commercial sources (Sigma-Aldrich, Alfa Aesar, BioSolve) unless stated otherwise. p-Xylene (99.9%) was dried over sodium and fractionally distilled under nitrogen and degassed prior to use. Ambrettolide was kindly received from Symrise. Ambrettolide and cyclooctene were freshly distilled from $CaH_2$ under nitrogen prior to use. All air and moisture sensitive reactions and preparations were either done in an MBraun MB-150 GI glovebox or using proper Schlenk techniques.

$^1$H NMR and $^{13}$C NMR spectra were recorded in 5 mm tubes on a Varian Mercury 400 MHz spectrometer at ambient probe temperature in chloroform-$d_1$. High temperature $^1$H NMR spectra were recorded in 5 mm tubes on a Varian Inova 500 MHz spectrometer at 110° C. in 1,1,2,2-tetrachloroethane-$d_2$. Chemical shifts are reported in ppm vs. tetramethylsilane (TMS).

Copolymerization reactions were followed by gas chromatography (GC) with a Shimadzu GC-2010 equipped with a flame ionization detector (FID) employing a CP-WAX 52 CB, 0.25 mm×25 m (DF=0.2 μm) column. Injection and detection temperatures were both set at 280° C. The internal standard method, taking cyclooctane (present as impurity in cis-cyclooctene) as the internal standard, was used to determine the lactone conversion.

High temperature size exclusion chromatography (SEC) of the unsaturated and saturated polymers was performed at 160° C. using a Polymer Laboratories PLXT-20 Rapid GPC Polymer Analysis System (refractive index detector and viscosity detector) with 3 PLgel Olexis (300×7.5 mm, Polymer Laboratories) columns in series. 1,2,4-Trichlorobenzene was used as eluent at a flow rate of 1 ml/min. (Polymer Laboratories). A Polymer Laboratories PL XT-220 robotic sample handling system was used as autosampler. The obtained molecular weights were calculated with respect to polystyrene standards (Polymer Laboratories, $M_p$=580 Da up to $M_p$=7.1×10$^6$ Da).

Differential scanning calorimetry (DSC) analyses of the polymers were carried out on a DSC Q100 from TA Instruments at a heating rate of 10° C.·min$^{-1}$. Second runs were recorded after cooling down to about 20° C. The melting temperatures reported correspond to the melting peaks in the second runs.

Fourier transform infrared spectra (FT-IR) were obtained using a Varian 610-IR spectrometer equipped with an FT-IR microscope. The spectra were recorded in a temperature range of 20-140° C. in transmission mode with a resolution of 2 cm$^{-1}$. Polymer films obtained from 1,1,2,2-tetrachloroethane at 110° C. were analyzed on a zinc selenium disk and heated using a Linkam TMS94 hot stage and controller. Varian Resolution Pro software version 4.0.5.009 was used for the analysis of the spectra.

Ring-Opening Metathesis Polymerizations

For all reactions, the cyclooctene used contained a fraction of cyclooctane, and the ambrettolide contained a fraction of added mesitylene. Both contaminations are harmless during the polymerization and were used as internal standards to determine the monomer conversion. In a typical ring-opening metathesis polymerization, cyclooctene (440 mg, 4.0 mmol), ambrettolide (1009, 4.0 mmol), 1$^{st}$ generation Grubbs catalyst (17.7 mg, 0.022 mmol) and p-xylene (1140 mmol) were added in a 20 ml glass crimp cap vial, which after dissolution of all the components was distributed over 9 crimp cap vials which were capped, taken out of the glovebox and put in a carousel reactor at 40° C. (t=0). At predetermined times, vials were taken out of the reactor, uncapped and an aliquot of the crude reaction mixture was taken and dissolved in THF in order to determine the conversion by GC-FID, relative to the internal standards, and the molecular weight by SEC (TCB at 160° C.).

For the polymerizations containing different ambrettolide to cyclooctene ratios, 20 ml glass crimp cap vials were charged with the monomers (cyclooctene+ambrettolide=2 g), 1$^{st}$ generation Grubbs catalyst (41.2 mg, 0.05 mmol), and 4.5 g of p-xylene. The vials were capped, taken out of the glovebox and put in a carousel reactor at 40° C. After three days, aliquots of the crude reaction mixture were analyzed for conversion (GC-FID) and molecular weight (SEC (TCB at 160° C.)). The reaction mixtures were diluted in toluene, after which the polymers were precipitated in cold methanol, washed with methanol (3 times) and dried under vacuum. The amount of ester bonds relative to carbon bonds was analysed using $^1$H NMR.

Hydrogenations of Unsaturated Polymers

All hydrogenation reactions of obtained unsaturated polymers containing different ratios of ambrettolide and cyclooctene were performed in a 250 ml steel Büchi reactor. A solution of 350 mg of the polymer in toluene was injected in the reactor (under argon), after which a 65 mg catalyst solution was loaded. The total amount of toluene in the reaction mixture was 50 g. Subsequently the reactor was flushed with $H_2$ for one minute, after which the $H_2$ pressure was raised to 10 bar and the temperature was raised to 90° C. The reaction mixture was allowed to react for 20 hours, after which the hot solution was precipitated in cold methanol, washed with methanol (3 times) and dried under vacuum yielding the saturated polyesters containing different M/E ratios. Full conversion of the double bonds was confirmed using high temperature $^1$H NMR by the disappearance of the double bond signal at 5.3-5.4 ppm.

The random polyesters according to the present invention can be used in compositions further comprising a polyolefin. The present random polyesters are less polar compared to polyesters comprising a relatively short chain length, i.e. less than 8 atoms, between the ester units making the inventive polyesters more compatible with the polyolefin and allowing a homogeneous composition of the polyolefin and the polyester without having an adverse effect on mechanical properties. At the same time, the inclusion of ester units in the polymer composition comprising also a polyolefin makes the composition more polar in comparison with the pure polyolefin, resulting in an increased surface tension and therefore improved ability to coat or print the material. This introduced polarity further opens up the possibility of adding other polar additives without the need for or at least reducing the required amount of a compatibilizer. In addition to the improved printability the barrier properties towards oxygen, when compared to polyolefins, is improved. In a more preferred embodiment, the random polyester is a composition wherein the polyolefin is polyethylene, more preferably LDPE or LLDPE. Linear low density polyethylene (LLDPE) as used herein means a low density polyethylene copolymer comprising ethylene and a C3-C10 alpha-olefin comonomer (ethylene-alpha olefin copolymer). Suitable alpha-olefin comonomers include 1-butene, 1-hexene, 4-methyl pentene and 1-octene. The preferred comonomer is 1-hexene. Preferably, the alpha-olefin comonomer is present in an amount of about 5 to about 20 percent by weight of the ethylene-alpha olefin copolymer, more preferably an amount of from about 7 to about 15 percent by weight of the ethylene-alpha olefin copolymer. The (linear) low density polyethylene ((L)LDPE) has a density of from 915 kg/m$^3$ to 940 kg/m$^3$ preferably from 915 kg/m$^3$ to 935 kg/m$^3$. The high density polyethylene (HDPE) has a density of from 940 to 965 kg/m$^3$. Polypropylene as used herein means propylene homopolymer or a copolymer of propylene with an α-olefin, including both random copolymers and heterophasic copolymers.

The composition can comprise from 5-95 wt %, more preferably from 20-80 wt % or 30-70 wt % of said polyolefin, and from 95-5 wt %, more preferably from 80-20 wt % or 70-30 wt % of said polyester, based on the total weight of the composition. The polymer composition is homogeneous and can be formed into an article such as a film. Such a film can also be combined with other polyolefin film so as to form a multilayer film. The film or the multilayer film can be used in packaging applications, preferably food packaging applications.

The following is a summary of the various embodiments described herein.

Embodiment 1

A polyester comprising a saturated backbone, wherein the number of backbone carbon atoms between two neighboring ester groups in the backbone is randomly distributed over the polyester, and wherein said polyester has an M/E ratio of 14 or more, wherein M is the number of backbone carbon atoms in the polyester not including the ester carbons and E is the number of ester groups in the polyester.

Embodiment 2

The polyester according to embodiment 1, wherein said polyester has an M/E ratio of 40 or more, preferably 50 or more, such as in the range of 50-500.

Embodiment 3

The polyester according to embodiment 1 or 2, wherein the backbone of said polyester comprises one or more functional side groups comprising one or more hydroxyl, acid, amine, or halogen groups.

Embodiment 4

The polyester according to any one of embodiments 1 to 3, comprising a number average molecular weight in the range of 2,000 g/mol to 1,000,000 g/mol, preferably in the range of 10,000 g/mol to 500,000 g/mol, more preferably in the range of 20,000 g/mol to 200,000 g/mol, said number average molecular weight being determined as the polystyrene-equivalent molecular weight by high temperature size exclusion chromatography performed at 160° C. in trichlorobenzene using polystyrene as standard.

Embodiment 5

The polyester according to any one of embodiments 1 to 4, wherein said polyester is linear or branched, or wherein said polyester is aliphatic.

Embodiment 6

The polyester according to any one of embodiments 1 to, wherein said polyester has a polydispersity index, defined as $M_w/M_n$, in the range of 2.0-4.0, preferably in the range of 2.0-3.5.

Embodiment 7

The polyester according to any one of embodiments 1 to 6, wherein said polyester has a melting point ($T_m$) of 90° C. or more, preferably of 110° C. or more, more preferably of 120 C or more, as measured using differential scanning calorimetry performed at a heating rate of 10° C. per minute and wherein the melting temperature corresponds to the melting peak in the second run.

Embodiment 8

A method of preparing a polyester of any one or more of embodiments 1 to 7, the method comprising copolymerizing one or more unsaturated lactones and one or more cycloalkenes via ring-opening metathesis polymerization to obtain an unsaturated polyester; and hydrogenating the unsaturated polyester to obtain the corresponding saturated polyester, said polyester comprising a saturated backbone, wherein the number of backbone carbon atoms between two neighboring ester groups in the backbone is randomly distributed over the polyester, and wherein said polyester comprises an M/E ratio of 14 or more, such as 30 or more, preferably 40 or more, more preferably 50 or more, such as in the range of 50-500, and wherein M is the number of backbone carbon atoms in the polyester not including the ester carbons, and E is the number of ester groups in the polyester.

Embodiment 9

A method according to embodiment 8, wherein copolymerizing is performed in the presence of a ring-opening metathesis polymerization catalyst, and the catalyst is preferably first generation Grubbs' catalyst, second generation Grubbs' catalyst, first generation Hoveyda-Grubbs catalyst, second generation Hoveyda-Grubbs catalyst, or Zhan catalyst.

Embodiment 10

A method according to any one of embodiments 8 to 9, wherein hydrogenating is performed in the presence of a hydrogenation catalyst, preferably Wilkinson's catalyst, Pd/C (palladium on carbon), Raney-nickel catalyst, palladium oxide, platinum oxide, or organic hydrogenation agents such as diimine (HN=NH) or p-tosyl hydrazide.

Embodiment 11

A method according to any one of embodiments 8 to 10, wherein copolymerizing comprises combining the unsaturated lactone and the cycloalkene together with a ring-opening metathesis polymerization catalyst and a solvent to provide a reaction mixture, and polymerizing the reaction mixture at a temperature in the range of 0-60° C., preferably in the range of 15-50° C., more preferably in the range of 20-45° C., such as about 40° C.

Embodiment 12

A polyester obtainable by a method according to any one of embodiments 8 to 11, said polyester comprising a saturated backbone, wherein the number of backbone carbon atoms between two neighbouring ester groups in the backbone is randomly distributed over the polyester, and wherein said polyester has an M/E ratio of 14 or more, wherein M is the number of backbone carbon atoms in the polyester not including the ester carbons and E is the number of ester groups in the polyester.

Embodiment 13

A polyester comprising an unsaturated backbone, wherein the number of carbon atoms between two neighboring ester groups in the backbone is randomly distributed over the polyester, and wherein said polyester comprises an M/E ratio of 14 or more, wherein M is the number of backbone carbon atoms in the polyester not including the ester carbons and E is the number of ester groups in the polyester.

Embodiment 14

A method of preparing the polyester of embodiment 13, said method comprising copolymerizing an unsaturated lactone and a cycloalkene via ring-opening metathesis polymerization to obtain an unsaturated polyester, said polyester comprising an unsaturated backbone, wherein the number of backbone carbon atoms between two neighboring ester groups in the backbone is randomly distributed over the polyester, and wherein said polyester comprises an M/E ratio of 14 or more, wherein M is the number of backbone carbon atoms in the polyester not including the ester carbons and E is the number of ester groups in the polyester.

Embodiment 15

A polymer composition comprising a polyolefin and a polyester according to any one or more of embodiments 1 to 7, 12 or 13.

In general, the compositions or methods can alternatively comprise, consist of, or consist essentially of, any appropriate components or steps herein disclosed. The invention can additionally, or alternatively, be formulated so as to be devoid, or substantially free, of any components, materials, ingredients, adjuvants, species, or steps used in the prior art compositions or that are otherwise not necessary to the achievement of the function and/or objectives of the present claims. The terms "a" and "an" do not denote a limitation of quantity, but rather denote the presence of at least one of the referenced item. The term "or" means "and/or" unless clearly indicated otherwise by context.

The endpoints of all ranges directed to the same component or property are inclusive of the endpoints, are independently combinable, and include all intermediate points and ranges.

Unless defined otherwise, technical and scientific terms used herein have the same meaning as is commonly understood by one skilled in the art to which this invention belongs. The term "combination" is inclusive of blends, mixtures, alloys, reaction products, and the like. Compounds are described using standard nomenclature. For example, any position not substituted by an indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the disclosure has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A polyester comprising a saturated backbone, wherein the number of backbone carbon atoms between two neighboring ester groups in the backbone is randomly distributed over the polyester, and wherein said polyester has an M/E ratio of 14 or more, wherein M is the number of backbone carbon atoms in the polyester not including the ester carbons and E is the number of ester groups in the polyester.

2. The polyester according to claim 1, wherein said polyester has an M/E ratio of 40 or more.

3. The polyester according to claim 1, wherein the backbone of said polyester comprises one or more functional side groups.

4. The polyester according to claim 1, comprising a number average molecular weight in the range of 2,000 g/mol to 1,000,000 g/mol, said number average molecular weight being determined as the polystyrene-equivalent molecular weight by high temperature size exclusion chromatography performed at 160° C. in trichlorobenzene using polystyrene as standard.

5. The polyester according to claim 1, wherein said polyester is linear or branched, or wherein said polyester is aliphatic.

6. The polyester according to claim 1, wherein said polyester has a polydispersity index, defined as $M_w/M_n$, in the range of 2.0-4.0.

7. The polyester according to claim 1, wherein said polyester has a melting point ($T_m$) of 90° C., as measured using differential scanning calorimetry performed at a heating rate of 10° C. per minute and wherein the melting temperature corresponds to the melting peak in the second run.

8. A method of preparing a polyester, the method comprising
copolymerizing one or more unsaturated lactones and one or more cycloalkenes via ring-opening metathesis polymerization to obtain an unsaturated polyester; and
hydrogenating the unsaturated polyester to obtain the corresponding saturated polyester,
said polyester comprising a saturated backbone, wherein the number of backbone carbon atoms between two neighboring ester groups in the backbone is randomly distributed over the polyester, and wherein said polyester has an M/E ratio of 14 or more, wherein M is the number of backbone carbon atoms in the polyester not including the ester carbons, and E is the number of ester groups in the polyester.

9. The method according to claim 8, wherein copolymerizing is performed in the presence of a ring-opening metathesis polymerization catalyst.

10. The method according to claim 8, wherein hydrogenating is performed in the presence of a hydrogenation catalyst.

11. The method according to claim 8, wherein copolymerizing comprises
combining the unsaturated lactone and the cycloalkene together with a ring-opening metathesis polymerization catalyst and a solvent to provide a reaction mixture, and
polymerizing the reaction mixture at a temperature in the range of 0-60° C.

12. A polyester prepared by a method comprising
copolymerizing one or more unsaturated lactones and one or more cycloalkenes via ring-opening metathesis polymerization to obtain an unsaturated polyester; and
hydrogenating the unsaturated polyester to obtain the corresponding saturated polyester,
said polyester comprising a saturated backbone, wherein the number of backbone carbon atoms between two neighboring ester groups in the backbone is randomly distributed over the polyester, and wherein said polyester has an M/E ratio of 14 or more, wherein M is the number of backbone carbon atoms in the polyester not including the ester carbons, and E is the number of ester groups in the polyester,
wherein said polyester has an M/E ratio of 40 or more.

13. A polyester comprising an unsaturated backbone, wherein the number of carbon atoms between two neighboring ester groups in the backbone is randomly distributed over the polyester, and wherein said polyester has an M/E ratio of 14 or more, wherein M is the number of backbone carbon atoms in the polyester not including the ester carbons and E is the number of ester groups in the polyester.

14. The method according to claim 8, wherein said polyester has an M/E ratio of 40 or more.

15. A polymer composition comprising a polyolefin and the polyester according to claim 1.

16. The polyester according to claim 1, wherein said polyester has
an M/E ratio in the range of 40 or more,
a number average molecular weight in the range of 10,000 g/mol to 500,000 g/mol, said number average molecular weight being determined as the polystyrene-equivalent molecular weight by high temperature size exclusion chromatography performed at 160° C. in trichlorobenzene using polystyrene as standard,
a polydispersity index, defined as $M_w/M_n$, in the range of 2.0-4.0,
a melting point ($T_m$) of 110° C. or more, as measured using differential scanning calorimetry performed at a heating rate of 10° C. per minute and wherein the melting temperature corresponds to the melting peak in the second run.

17. The polyester according to claim 1, wherein said polyester has an M/E ratio in the range of 50-500, a number average molecular weight in the range of 20,000 g/mol to 200,000 g/mol, said number average molecular weight being determined as the polystyrene-equivalent molecular weight by high temperature size exclusion chromatography performed at 160° C. in trichlorobenzene using polystyrene as standard, a polydispersity index, defined as $M_w/M_n$, in the range of 2.0-3.5, a melting point ($T_m$) of 120° C. or more, as measured using differential scanning calorimetry performed at a heating rate of 10° C. per minute and wherein the melting temperature corresponds to the melting peak in the second run.

18. A polymer composition comprising a polyolefin and the polyester according to claim 13.

19. A polymer composition comprising a polyolefin and the polyester according to claim 16.

20. A polymer composition comprising a polyolefin and the polyester according to claim 17.

\* \* \* \* \*